H. C. HART.
DIFFERENTIAL GEAR MECHANISM.
APPLICATION FILED MAR. 8, 1911.
1,053,727.
Patented Feb. 18, 1913.
2 SHEETS—SHEET 1.
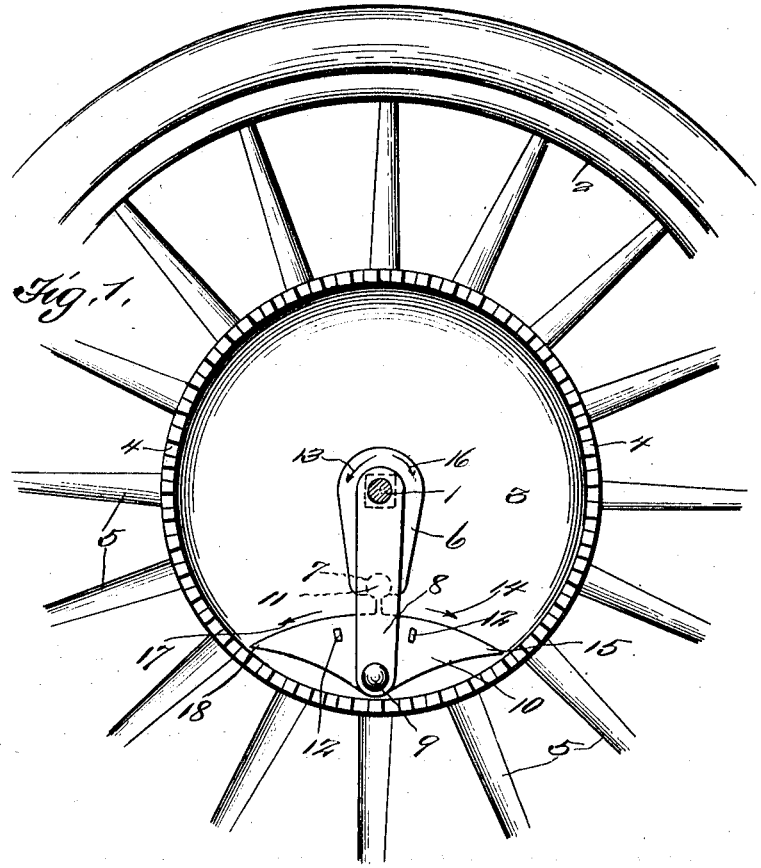
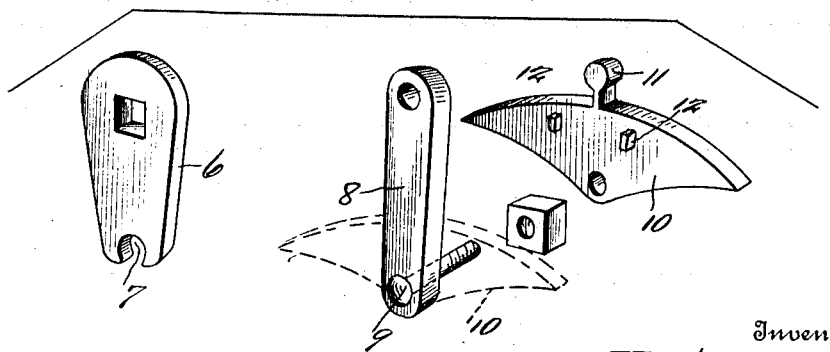
Witnesses
Inventor
H.C. Hart,
By D. Swift & Co.
Attorney

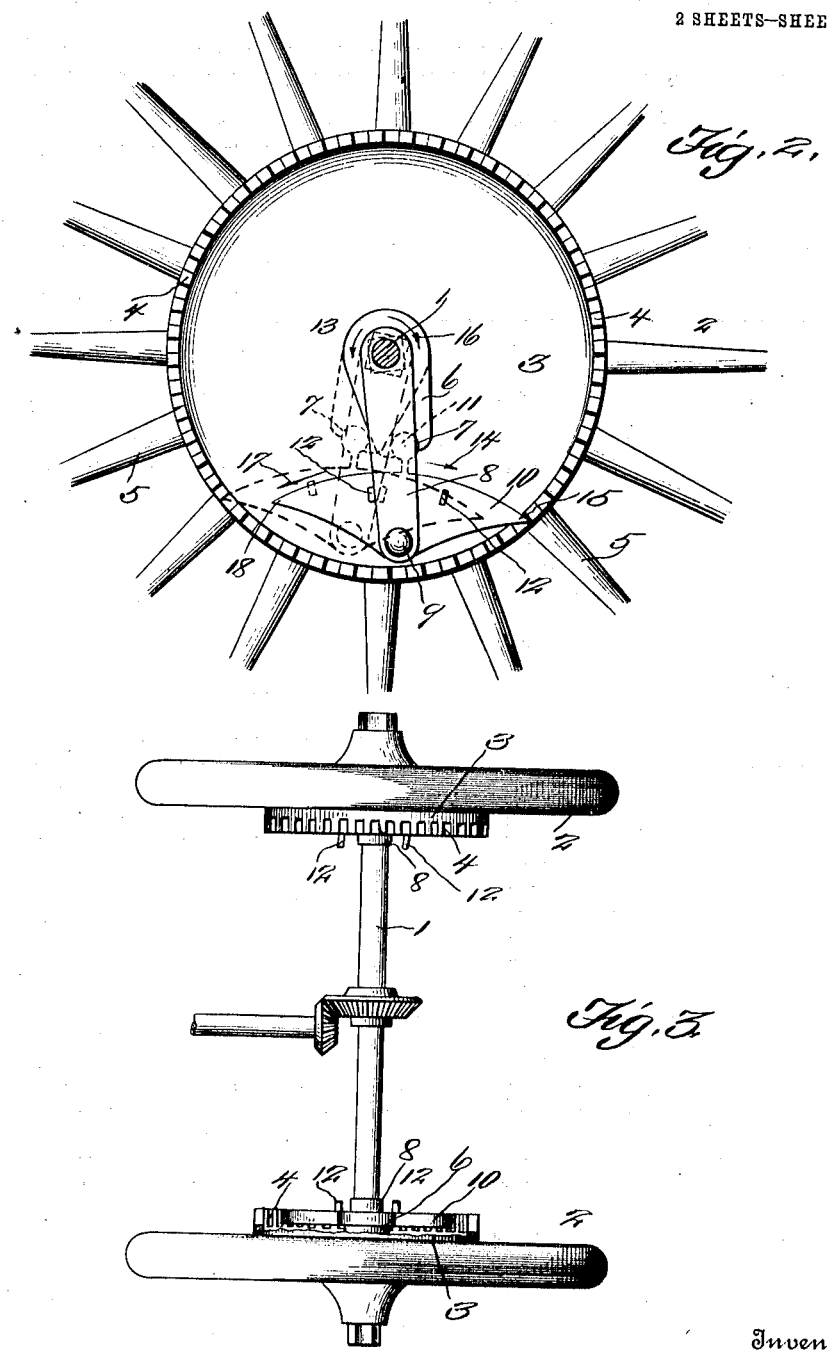

UNITED STATES PATENT OFFICE.

HOWARD C. HART, OF RUSSIAVILLE, INDIANA.

DIFFERENTIAL-GEAR MECHANISM.

1,053,727.   Specification of Letters Patent.   Patented Feb. 18, 1913.

Application filed March 8, 1911. Serial No. 613,089.

*To all whom it may concern:*

Be it known that I, HOWARD C. HART, a citizen of the United States, residing at Russiaville, in the county of Howard and State of Indiana, have invented a new and useful Differential-Gear Mechanism; and I do hereby declare the following to be a full, clear, and exact description of the invention, such as will enable others skilled in the art to which it appertains to make and use the same.

This invention relates to a new and useful differential gearing mechanism adapted for use upon the driving shaft or axle of an automobile.

The object of the invention is to provide a novel device of this design for transmitting power to the driving wheels of an automobile, so as to traverse the same forwardly or rearwardly.

A further object of the invention is to construct the differential gearing in such a manner that when the wheels of the automobile are rotating in one direction and the axle or shaft in the same direction, there exists no transmission of power, therefore no pulling action is accomplished, because a loosely pivoted member slips or passes by the lugs or teeth of the wheels. By this arrangement, an automobile may be pulled out of a muddy, slick or slippery place, with greater ease than by the employment of similar devices, because just as soon as one or the other of the wheels comes in contact frictionally with a solid foundation, sufficient frictional hold is attained, which will cause the automobile to move forwardly or rearwardly.

A further object of the invention is to provide a device of this nature comprising a rimmed disk constituting a part of a wheel and mounted upon an axle, on which a fixed and a loose arm are arranged, there being substantially a diamond-shaped dog pivoted to the loosely mounted arm and having a flexible connection to the fixed arm, and forming integral parts of the dog are lugs, one on each side of the loosely mounted arm to limit the dog in its movement and to engage the loosely mounted arm simultaneously with the engagement of either end of the dog with teeth of the rim of the disk, thus constituting means to relieve the strain on the dog and the teeth.

In the drawings, however, there is only disclosed one form of the invention, but, in practical fields, this form may require alterations, to which the applicant is entitled, provided the alterations are comprehended by the appended claims.

The invention comprises further features and combinations of parts hereinafter set forth, shown in the drawings and claimed.

In the drawings:—Figure 1 is a view in elevation, showing the application of the improved differential gearing, the same being constructed in compliance with the invention. Fig. 2 is a view similar to Fig. 1, with the exception that the parts of the differential gearing are shown as in coöperation, in full lines, so as to drive the automobile in one direction, and in dotted lines so as to drive the automobile in the reverse direction. Fig. 3 is a plan view. Fig. 4 is a detail view.

Referring to the drawings, 1 designates the driving axle or shaft, while 2 denotes the wheels thereof. The wheels 2 comprise the rimmed disk 3 having the teeth or lugs 4 and the spokes 5, which project from the rim of the disk. The spokes connect with the outer rim of the wheel, there only being a section of this rim shown. Fixed to the axle or shaft 1 are the stationary arms 6, the free ends of which are provided with notches or recesses 7.

Loosely mounted on the axle or shaft 1 are the levers or arms 8, the lower free ends of which are provided with the pins or studs 9. Loosely mounted on the pins or studs 9 are the dogs or clutch members 10, which are approximately diamond-shaped in contour. Projecting radially from the convex curved edge of the dogs or clutch members are the lugs or projections 11, which enter the recesses or notches of the arms 6. To limit the dogs or clutch members 10 in their movements, lugs 12 are provided, which project laterally from the dogs, and between which the arms or levers 8 are arranged. These lugs 12 when the dogs are oscillated engage the loosely mounted arms simultaneously with the engagement of either end of the dog with the teeth 4, thus constituting means to relieve the strain on the dogs and the teeth.

When the shaft or axle 1 is rotated in the direction of the arrow 13, the arms 6 move with it in the same direction, and by virtue of the coöperation between the lugs 11 and the recesses or notches 7, the dogs or clutch members are rocked in the direction of the arrow 14, thus throwing the pointed end 15 in engagement with the teeth of the rimmed disk, thus causing the wheels 2 to rotate with the shaft 1. When the shaft 1 is rotated in this direction, the arms 8 are moved in the same direction, because of the coöperation between the lugs 11 and the notches or recesses 7. The rocking of the dogs or clutch members 10 is limited by one of the lugs 12. However, when the shaft or axle 1 is rotated in the direction of the arrow 16, the arms 6 are moved with it, which, in turn, rock the dogs or members 10 in the direction of the arrow 17, thus causing the pointed ends 18 thereof to engage between the teeth or lugs of the rimmed disk. When the pointed ends 18 are thrown into engagement with the teeth or lugs of the rimmed disk, the automobile is driven in the reverse or rearward direction.

By the construction shown in the drawings and described, it will be seen that an automobile may very readily pull out of a muddy, slick or slippery place, especially in case one wheel or the other contacts frictionally with the solid foundation.

This differential gearing may be applied in the brake drum with a one piece solid axle, or in the center of a full floating axle, or any other desired suitable place. The power is transmitted to the slower moving wheel, and the parts of this differential gearing differentiate by allowing the loose wheel to travel faster. If one of the drive wheels should not move properly, by being in a slick, muddy place, the other wheel will pull the machine out.

The invention having been set forth, what is claimed as new and useful is:—

In combination; a driving axle; a wheel loosely journaled thereon having a rimmed disk constituting a part of the hub of the wheel; the rim of the disk having laterally extending crown teeth; an arm fixed to the axle, and terminating at its free ends in a semi-circular socket; a second arm loosely journaled on the axle; an approximately diamond-shaped dog pivoted to the free end of the loosely mounted arm, either free end of which being adapted to engage the teeth of the rim; the dog having a lug terminating in a circular head received in the semi-circular socket, and located substantially midway between the free ends of the dog, whereby when the fixed arm moves the dog will oscillate on its pivot; lugs forming integral parts of the dog, one on each side of the loosely mounted arm to limit the dog in its movement, and to engage the loosely mounted arm simultaneously with the engagement of either end of the dog with the teeth, thus constituting means to relieve the strain on the dog and the teeth; and a bolt and nut connection pivoting the dog to the loosely mounted arm.

In testimony whereof I have signed my name to this specification in the presence of two subscribing witnesses.

HOWARD C. HART.

Witnesses:
 DON McCREARY,
 BLANCH MORROW.